United States Patent
Winterhalter

(10) Patent No.: US 8,220,998 B2
(45) Date of Patent: Jul. 17, 2012

(54) FLUID DYNAMIC BEARING

(75) Inventor: Olaf Winterhalter, Epfendorf (DE)

(73) Assignee: Minebea Co., Ltd., Nagano-ken (JP)

( * ) Notice: Subject to any disclaimer, the term of this patent is extended or adjusted under 35 U.S.C. 154(b) by 305 days.

(21) Appl. No.: 12/766,196

(22) Filed: Apr. 23, 2010

(65) Prior Publication Data

US 2010/0270881 A1 Oct. 28, 2010

(30) Foreign Application Priority Data

Apr. 28, 2009 (DE) .......................... 10 2009 019 170

(51) Int. Cl.
*F16C 32/06* (2006.01)

(52) U.S. Cl. ........................................ 384/114; 384/100

(58) Field of Classification Search .................. 384/100, 384/107, 114, 115, 120
See application file for complete search history.

(56) References Cited

U.S. PATENT DOCUMENTS

| | | | |
|---|---|---|---|
| 5,407,281 A | 4/1995 | Chen | |
| 7,345,392 B2 | 3/2008 | Hafen | |
| 7,465,098 B2 * | 12/2008 | Hendriks et al. | 384/114 |
| 7,645,073 B2 * | 1/2010 | Tokuno et al. | 384/107 |
| 2005/0006969 A1 | 1/2005 | Kull | |
| 2005/0025402 A1 | 2/2005 | Miyajima | |
| 2006/0039637 A1 * | 2/2006 | Huang | 384/114 |
| 2006/0153479 A1 * | 7/2006 | Kull | 384/100 |

FOREIGN PATENT DOCUMENTS

| | | |
|---|---|---|
| DE | 10 2004 040295 | 3/2006 |
| EP | 1098096 | 5/2001 |

* cited by examiner

*Primary Examiner* — Thomas R Hannon
(74) *Attorney, Agent, or Firm* — Cooper & Dunham LLP

(57) ABSTRACT

The invention relates to a fluid dynamic bearing system having a stationary bearing component and a moving bearing component, that are separated from one another by a bearing gap filled with a bearing fluid. There are two radial bearing regions separated from one another and marked by radial bearing grooves. A separator region having a larger bearing gap width is disposed between the radial bearing regions. The radial bearing grooves of the two radial bearing regions have inner ends facing each other and outer ends facing away from each other. At least the outer ends of the radial bearing grooves are connected to each other by connecting grooves. According to the invention, wear zones provided especially for this purpose are disposed adjoining the connecting grooves, so as to prevent material wear at other regions of the bearing.

20 Claims, 5 Drawing Sheets

Detail A

Detail A

Detail Y

FLUID DYNAMIC BEARING

BACKGROUND OF THE INVENTION

The invention relates to a fluid dynamic bearing used particularly for the rotatable support of a spindle motor. These kinds of spindle motors are used, for example, for driving hard disk drives or fans.

PRIOR ART

Fluid dynamic bearing systems of a well-known design comprise a stationary bearing component and a moving bearing component that are separated from one another by a bearing gap filled with a bearing fluid. Two radial bearing regions that are separated from one another and marked by radial bearing grooves are usually provided. The radial bearing grooves of the two radial bearing regions have inner ends facing each other and outer ends facing away from one another. The outer ends of the radial bearing grooves may be connected to each other by connecting grooves.

U.S. Pat. No. 5,407,281 A shows a fluid dynamic bearing having radial bearing grooves whose ends are connected to each other by connecting grooves. The connecting grooves are used to equalize pressure between the individual radial bearing grooves thus preventing zones having very high pressure from occurring in the bearing fluid. The connecting grooves, moreover, act as a reservoir for the bearing fluid pumped through the radial bearing grooves.

In this known embodiment of a fluid dynamic bearing, the problem that arises particularly when the bearing starts and stops is that the moving bearing component, mostly the shaft, tilts in the bearing bore of the stationary bearing component. When the relative speed between the bearing components is low or when they are at a standstill, the bearing groove patterns do not produce sufficient fluid dynamic pressure in the bearing, so that the shaft within the bearing bore becomes accordingly tilted. The outer surface of the shaft at least partially touches the inner cylindrical surface of the bearing bore and material wear occurs. Particularly in the transition region between the bearing groove patterns and the non-patterned regions of the shaft or in the region of the connecting groove of the bearing groove patterns, this kind of material wear occurs on the shaft or the bearing bush. The greater the load on the bearing, the greater is the wear. The abrasion particles soil the bearing fluid and change the geometry of the bearing groove patterns. This results in a change in the viscosity of the bearing fluid or in the pressure conditions in the bearing caused by the altered geometry of the bearing groove patterns. The bearing groove patterns are designed to be partially asymmetric, and the desired asymmetry is changed by this wear to the detriment of the bearing properties.

In US 2005/025402 A1 the problem of the tilting shaft and the wear to the bearing components that consequently occurs on starting and stopping of the bearing has been recognized. This US document proposes to restrain the particles produced by wear by using a particle filter so that they do not soil the entire bearing fluid.

EP 1 098 096 A1 also deals with the problem of a tilting shaft and wear on starting and stopping the bearing. It has previously been known to force the shaft into a specific tilted position using external forces, with the aid, for example, of the magnetic system of the motor. The EP document proposes that the edge of the bearing bush or the corresponding opposing surface of the shaft be chamfered, so that the surfaces vulnerable to wear at the expected tilt of the shaft run substantially parallel to one another and no wear occurs.

Thus the solutions known from the prior art dealing with the problem of wear are concerned with either preventing wear entirely by changing the bearing bore or filtering the abrasion particles out of the bearing fluid.

SUMMARY OF THE INVENTION

It is the object of the invention to provide a fluid dynamic bearing in which the effects of the above-mentioned problem of wear are prevented, but not the wear itself. The original bearing properties are to be maintained despite the occurrence of wear.

This object has been achieved according to the invention by a fluid dynamic bearing according to the characteristics outlined in claim 1.

Preferred embodiments and further advantageous characteristics of the invention are cited in the subordinate claims.

The fluid dynamic bearing system comprises a stationary bearing component and a moving bearing component that are separated from one another by a bearing gap filled with a bearing fluid. There are two radial bearing regions that are separated from one another and marked by radial bearing grooves, the radial bearing grooves of the two radial bearing regions having inner ends facing each other and outer ends facing away from one another, and at least the outer ends of the radial bearing grooves being connected to each other by connecting grooves.

According to the invention, wear is deliberately permitted on appropriate surfaces of the shaft or the bearing bush and wear zones provided especially for this purpose are disposed adjoining the connecting grooves of the bearing groove patterns, where wearing preferably takes place.

The wear zones do not have any bearing functions, so that wearing of the material in the region of the wear zones does not result in any deterioration to the bearing properties.

According to the invention, the wear zones lie on the same level as the bearing surfaces of the radial bearing regions.

The radial bearing grooves take the form of depressions in the bearing surface of the stationary and/or moving bearing component. The depth of the connecting grooves approximately corresponds to the depth of the radial bearing grooves. The depth of the radial bearing grooves and the connecting grooves is preferably approximately 6+/−2 micrometers for a bearing system as used in a spindle motor for driving a 3.5 inch hard disk drive.

The width of the connecting grooves for a 3.5 inch motor is preferably approximately 0.1 millimeters.

The width of the wear zones for a 3.5 inch motor is preferably approximately 0.22 millimeters.

The stationary bearing component comprises a bearing bush and a covering cap that seals the bearing bush, whereas the moving bearing component comprises a shaft and a thrust plate connected to the shaft. In a preferred embodiment of the invention, the thrust plate is formed integrally with the shaft as one piece. This makes it possible to keep the height of the thrust plate down to a minimum and to maximize the bearing distance, i.e. the distance between the two radial bearing regions.

The radial bearing grooves, the connecting grooves and the wear zones are preferably disposed on the surface of the bearing bush or bearing bore respectively. Should this be the case, the shaft or the surface of the shaft is made smoothly cylindrical. However, the radial bearing grooves, connecting grooves and wear zones may be disposed on the shaft, in which case the bearing bore is made smoothly cylindrical.

In order to reduce material wear in the region of the wear zones, the invention can also provide for the surfaces of the wear zones to be coated. A coating such as a DLC coating (diamond-like carbon coating) may be used for the wear zones. A DLC layer is relatively hard, having a Vickers hardness of approximately 1000 to 5000 and has good friction properties having, for example, a friction coefficient against steel unlubricated of about 0.1. The typical thickness of a DLC coating is 1 to 2 micrometers. Moreover, the wear zones may also be given a nickel coating. A nickel coating has high wear resistance and also provides protection against excessive material wear in the region of the wear zones. Another possibility of coating the wear zones is to use an NFC coating (near frictionless carbon coating). Here, the surface of the wear zones is covered with a thin, ultra-hard carbon layer. Using the NFC coating, it is possible to achieve friction coefficients of 0.02 to 0.06. Furthermore, wear resistance is very high. The thickness of the layer is typically about 1 micrometer.

According to a preferred embodiment of the invention, the wear zones in the bearing bush can be disposed in the region of the bearing bore. It is thus also conceivable according to the invention that not only the wear zones are given an appropriate coating as described above, but also the entire surface of the bearing bore. This saves masking the surface regions that are not to be coated and thus a production step.

In another embodiment of the invention, the wear zones may be disposed on the shaft. It is again conceivable according to the invention not only to coat the wear zones, but also the entire shaft with a coating in the manner described above. The shaft is generally a simple cylindrical component that may be very easily coated. It is of course possible to have both components, i.e. the bearing bore as well as the surface of the shaft, coated with a coating of the type described above. This kind of coating decreases material wear at the wear zones and reduces the amount of abrasion particles in the bearing gap.

The fluid dynamic bearing system according to the invention can be preferably used for the rotatable support of a rotor of a spindle motor. A respective spindle motor is also claimed.

The invention is described in more detail below with reference to the drawings. Further characteristics and advantages of the invention can be derived from this.

DESCRIPTION OF A PREFERRED EMBODIMENT OF THE INVENTION

Figure 1:
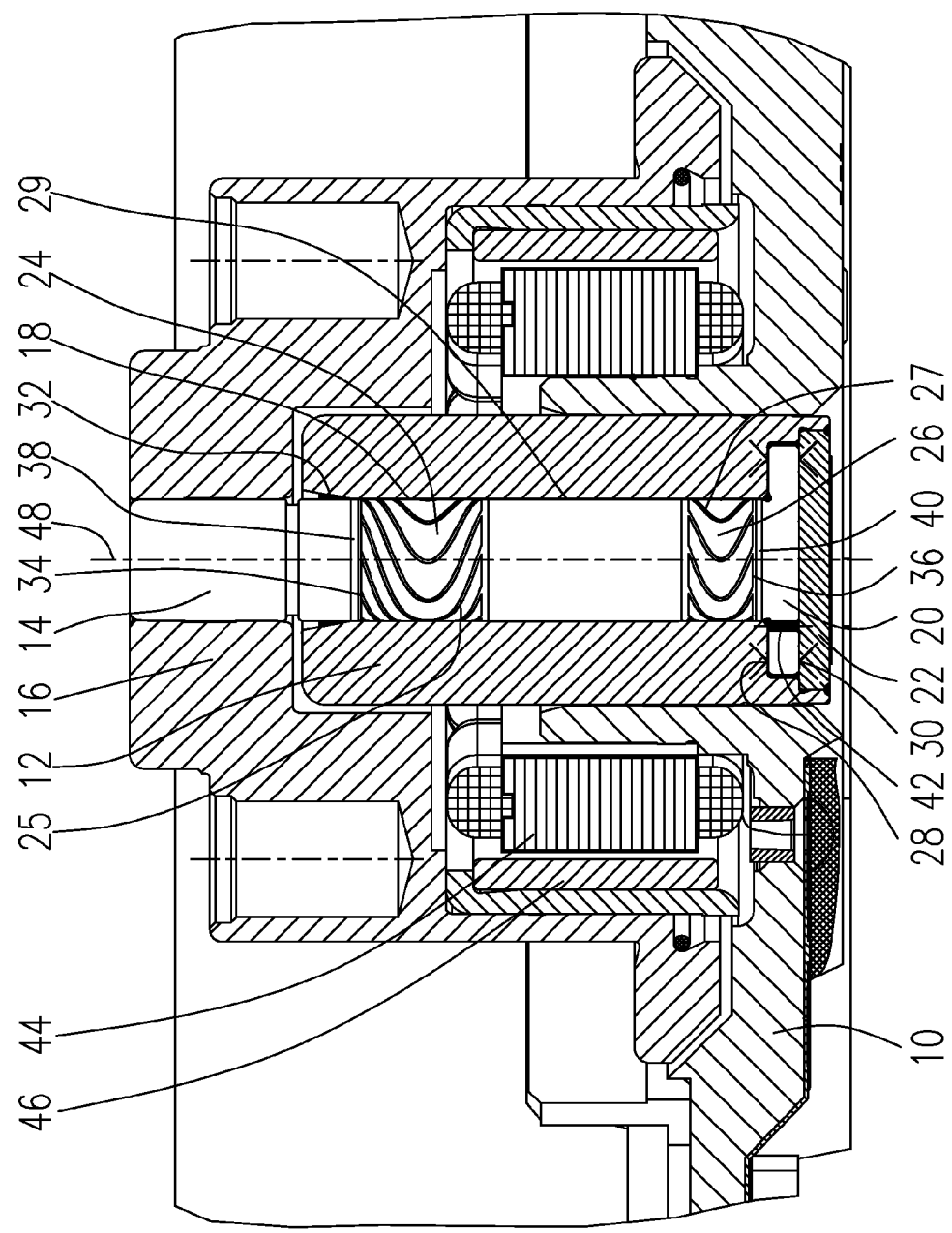
FIG. 1: shows a section through a spindle motor having a bearing system according to the invention.

FIG. 1 shows a section through a spindle motor that is rotatably supported using a bearing according to the invention. The spindle motor comprises a stationary baseplate 10 in which a bearing bush 12 is fixed. The bearing bush 12 has an axial cylindrical bearing bore 13 in which a shaft 14 is rotatably accommodated. The bearing bush 12 and the shaft 14 together form a part of the fluid dynamic bearing system. A bearing gap 18 filled with a bearing fluid, such as a lubricating oil, is provided between the inside diameter of the bearing bore 13 and the somewhat smaller outside diameter of the shaft 14. The bearing gap preferably has a gap width of a few micrometers. The fluid dynamic bearing system comprises two radial bearing regions 24, 26 that are marked by corresponding radial bearing grooves 25, 27. The radial bearing grooves 25, 27 are provided on the surface of the bearing bore 13 and/or the surface of the shaft 14. The two radial bearing regions 24, 26 are separated axially by a region having a larger bearing gap width, called the separator region 29. The separator region preferably has a gap width of some tens of micrometers. At one end of the shaft a thrust plate 20 is disposed that is preferably integrally formed with the shaft 14 as one piece. Opposite the thrust plate 20, the bearing bush 12 is closed by a covering cap 22. Both the thrust plate 20 as well as the covering cap 22 are received in appropriate recesses in the bearing bush concentric to the bearing bore 13. The two end faces of the thrust plate 20 together with opposing surfaces of the bearing bush 12 or the covering cap 22 form two axial bearing regions 28, 30. As soon as the shaft 14 is set in rotation in the bearing bush 12, fluid dynamic pressure is built up in the bearing gap 20 due to the groove patterns of the radial or axial bearing regions, thus giving the bearing its load-carrying capacity.

The open end of the bearing gap is sealed by a seal, such as a tapered capillary seal 32. The free end of the shaft 14 is connected to a hub 16. The hub 16 is designed according to the purpose of the spindle motor. If the spindle motor is intended to drive a hard disk drive, one or more storage disks (not illustrated) of the hard disk drive are disposed and fixed on the hub 16. At a lower, inner edge of the hub, an annular permanent magnet 46 having a plurality of pole pairs is disposed. Opposite the permanent magnet, a stator arrangement 44 is fixed to the baseplate 10, the stator arrangement 44 being separated from the permanent magnet 46 by a radial air gap. The stator arrangement 44 has corresponding stator windings which, when appropriately energized, generate an alternating electric field so that the rotor, consisting of the hub 16 and the shaft 14, is set in rotation.

On rotation of the shaft, the radial bearing grooves 25, 27 of the radial bearing regions 24, 26 in particular generate a pumping effect that activates the bearing fluid and generates fluid dynamic pressure in the bearing gap 18. Connecting grooves 34, 36 are provided to equalize the pressure and to prevent negative pressure zones at the ends of the radial bearing grooves 25, 27. The connecting grooves 34, 36 connect the ends of the radial bearing grooves 25, 27 to one another and need not be disposed only on the ends of the radial bearing grooves 25, 27 facing away from each other, but also on the ends of the radial bearing grooves 25, 27 facing each other.

As long as the shaft 14 rotates in the bearing bore 13, it is stabilized by the fluid dynamic pressure generated by the radial bearing grooves 25, 27 and runs contact-free in the bearing bore 13, separated by the bearing gap 18. However when the bearing starts or stops, there is no or only low fluid dynamic pressure in the bearing gap 18 so that the shaft 14 tilts in the bore 13 and touches the surface of the bore in the region of the outer edges of the radial bearing regions and particularly in the region of the connecting grooves 34, 36. This contact causes wear to the affected regions of the bearing bore 13 and the shaft 14, particularly at the edges of the connecting grooves 34, 36.

According to the invention, appropriate wear zones 38, 40 are provided only where particularly heavy wear is ascertained. These wear zones 38, 40 are disposed directly adjoining the outer connecting grooves 34, 36. The wear zones 38, 40 are located in the region of the section of the bearing gap 18 extending axially and parallel to the rotational axis 48, i.e. in the region of the bearing gap having a gap width of a few micrometers. Wear zone 38 is located between the connecting groove 34 and the start of the seal 32. The other wear zone 40 is located between the connecting groove 36 and the transition to the thrust plate 20. The wear zones 38, 40 may be given a low-wear and/or low-friction surface coating so as to reduce wear and frictional resistance. Suitable for this purpose are, for example, DLC coatings, nickel coatings or NFC coatings.

Figure 2:
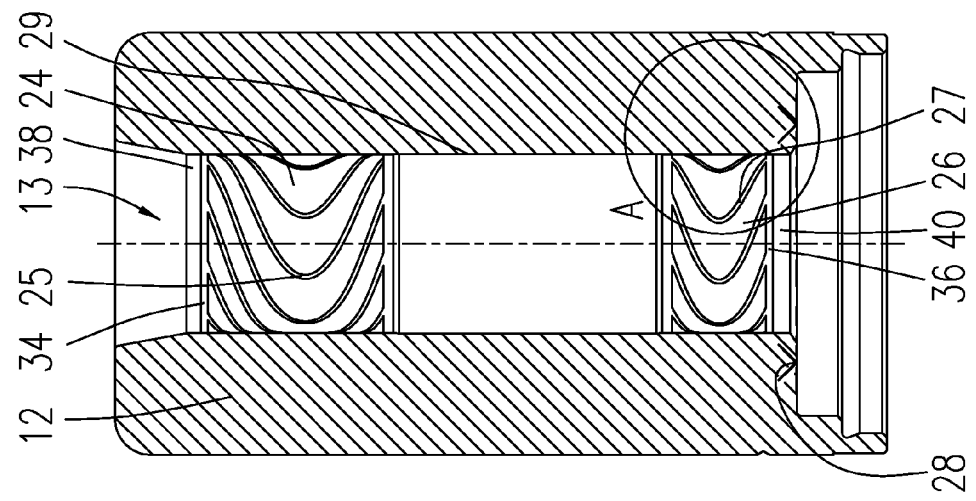
FIG. 2: shows a section through a bearing bush of the bearing system according to the invention.

FIG. 2 shows an enlarged view of the bearing bush 12 of the fluid dynamic bearing. The bearing groove patterns 25, 27 of the radial bearing regions 24, 26 are preferably disposed in the region of the wall of the bearing bore 13. Similarly, the connecting grooves 34, 36 are also machined in the wall of the bearing bore 13. The wear zones 38, 40 are located at the same level as the bearing surfaces of the radial bearing regions, in other words the regions not provided with grooves.

The figures show a spindle motor for driving a hard disk drive having a form factor of 3.5 inches, in other words a hard disk drive having 3.5 inch storage disks. The diameter of the bearing bush is approximately 9.5 millimeters and the diameter of the shaft approximately 4 millimeters. The depth of the radial bearing grooves as well as the connecting grooves is 6+/−2 micrometers. The wear zones lie approximately on the same level as the non-patterned bearing surfaces. The width of the connecting grooves 34, 36 is, for example, 0.1 millimeters. The wear zones are, for example, 0.25 millimeters wide. The thickness of the thrust plate that is formed integrally with the shaft as one piece is approx. 1 millimeter. It can be seen from FIG. 2 that the radial bearing grooves 25 of the radial bearing region 24 are asymmetric in design. The branches of the sine-shaped grooves 25 are longer at the wear zone 38 side than at the inner side, seen with reference to the apex of the patterns. The radial bearing grooves 27 of the radial bearing region 26 are designed substantially symmetric with reference to their apex.

The dimensions described above should only be taken by way of example and may be varied depending on the size and purpose of the bearing.

Figure 3:
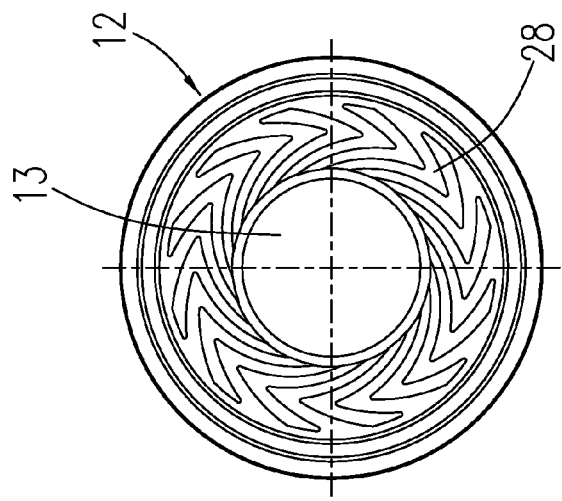
FIG. 3: shows a view of the bearing bush from below.

FIG. 3 shows a view of the bearing bush 12 on to the opening sealed by the covering cap. The approximately V-shaped herringbone bearing grooves of the axial bearing region 28 that are disposed on one end face of the bearing bush 12 can be seen. The covering cap 22 has similar bearing groove patterns (not illustrated) and, together with the other end face of the thrust plate, forms the second axial bearing region 30.

Figure 4:
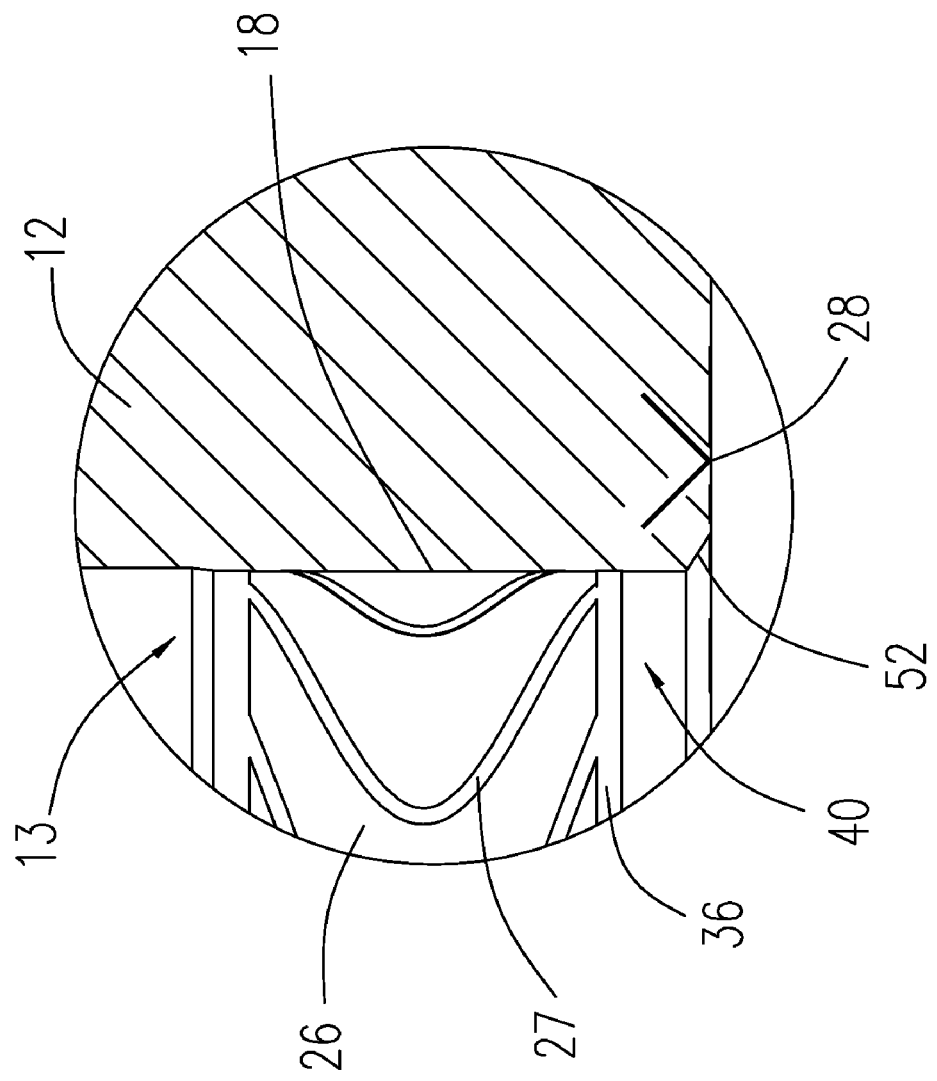
FIG. 4: shows an enlarged view of detail A in FIG. 2.

FIG. 4 shows an enlarged view of detail A of FIG. 2. A section through the bearing bush 12 can be seen on the right-hand side of the drawing and the bearing bore 13 in the bearing bush 12 on the left. The radial bearing groove patterns 27 of the radial bearing region 26 are machined on the surface of the bearing bore 13. The radial bearing grooves 27 are connected to each other at both ends by a connecting groove 36. The connecting groove 36 that faces the thrust plate 20 is provided with an adjoining wear zone 40. The wear zone 40 still lies in the region of the bearing gap 18 thus not in the region of a chamfer 52 that forms the transition to the recess for the thrust plate 20.

Alongside the wear zones 38, 40 according to the invention, the bearing system or the spindle motor has further advantageous characteristics.

An important characteristic is the thrust plate 20 that is formed as an integral part of the shaft 14. This makes it possible for the thrust plate 20 to be made very thin, so that the useful bearing span, i.e. the maximum possible distance between the two radial bearing regions 24, 26, can be made larger. In addition, the thinner thrust plate compensates the space required for the wear zones.

The fluid dynamic bearing illustrated is particularly suitable for spindle motors having high loads, for example, for driving hard disks having four or five storage disks, where relatively heavy wear can be expected.

The wear zones are not significant for the function of the bearing, so that any wear in this region does not affect the properties of the bearing. The wear zones go to reduce the available bearing span, which however can be compensated by the thin thrust plate.

Because the bearing is subject to heavy loads, the connecting region between the free end of the shaft 14 and the hub 16 is also made relatively long, so as to ensure a secure and safe connection.

Since the bearing has to absorb a high load, more driving power is needed which leads to an increase in heat generation. Higher heat generation results in increased loss of bearing fluid through evaporation, so that the seal 32, which acts simultaneously as a reservoir for the bearing fluid, is made longer, in other words it has a larger volume than a conventional bearing.

Furthermore, the surface of the radial bearing regions 24, 26 is relatively large, i.e. the axial length compared to the length of the shaft 14 in particular. This goes to produce a greater fluid dynamic effect and the bearing becomes load-carrying already at low rotational speeds. This reduces the operating time for starting or stopping the bearing that is susceptible to friction.

Figure 5:
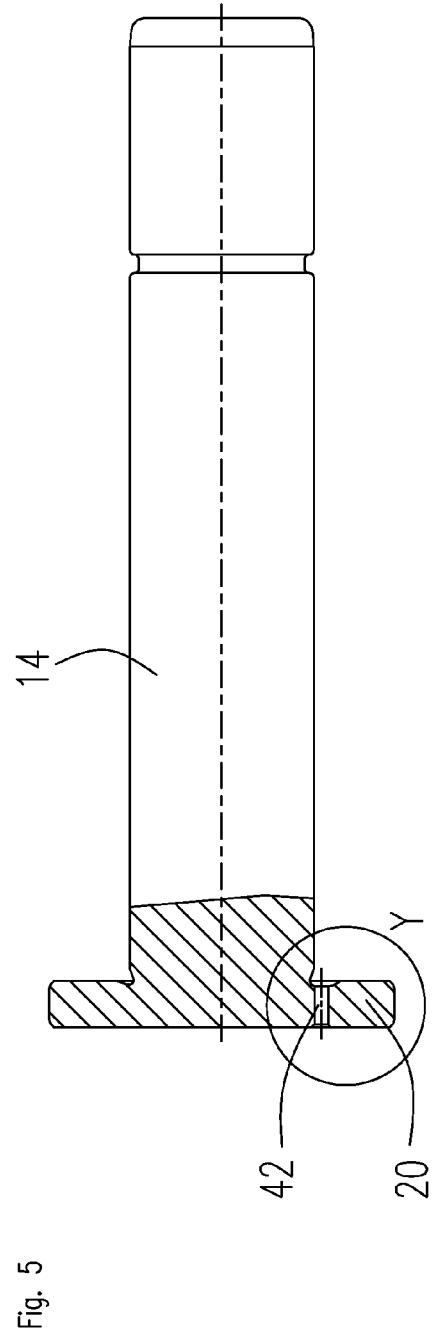
FIG. 5: shows a section through the shaft of the bearing system according to the invention having a thrust plate.
Figure 7:
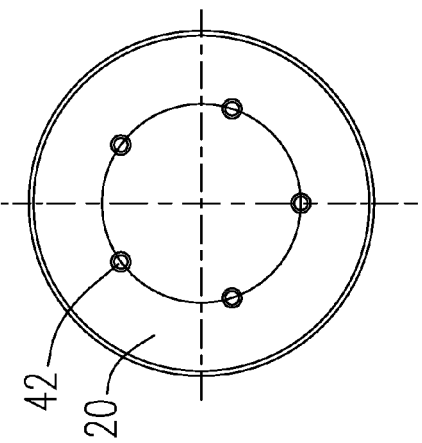
FIG. 7: shows a view of the thrust plate from below.

FIG. 5 shows a section through the shaft 14 of the bearing system having an integral thrust plate 20. The thrust plate 20 has a series of axial holes 42 that act as recirculation channels between the sections of the bearing gap in the region of the axial bearing 28, 30. These holes 42 can be particularly seen in FIG. 7. The holes 42 are drilled from the side of the thrust plate 20 facing away from the shaft and cause the respective formation of burrs where the bit emerges at the other end face. To prevent surfaces of the bearing bush that belong to the axial bearing region 28 from being damaged by these burrs, the invention provides for a recess 50 to be disposed in the exit region of the hole 42. Any burr formation at the edge of the hole will now occur within the recess 50 and does not go beyond the surface of the thrust plate 20. This prevents any damage to the bearing surfaces.

Figure 6:
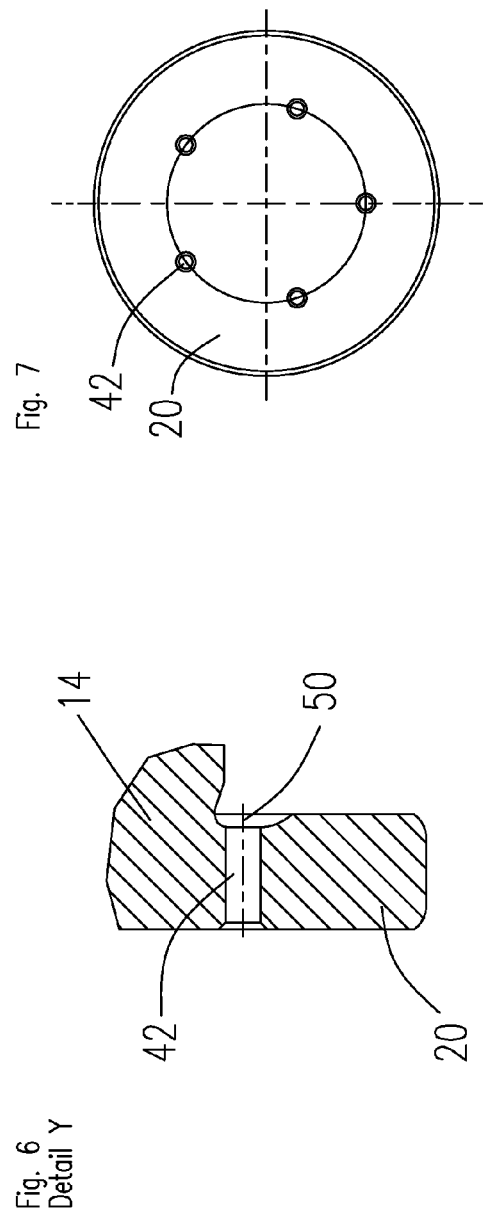
FIG. 6: shows an enlarged view of detail Y from FIG. 5.

FIG. 6 shows detail Y from FIG. 5 where the respective region of the thrust plate 20 and the hole 42 or the recess 50 are illustrated.

Figure 8:
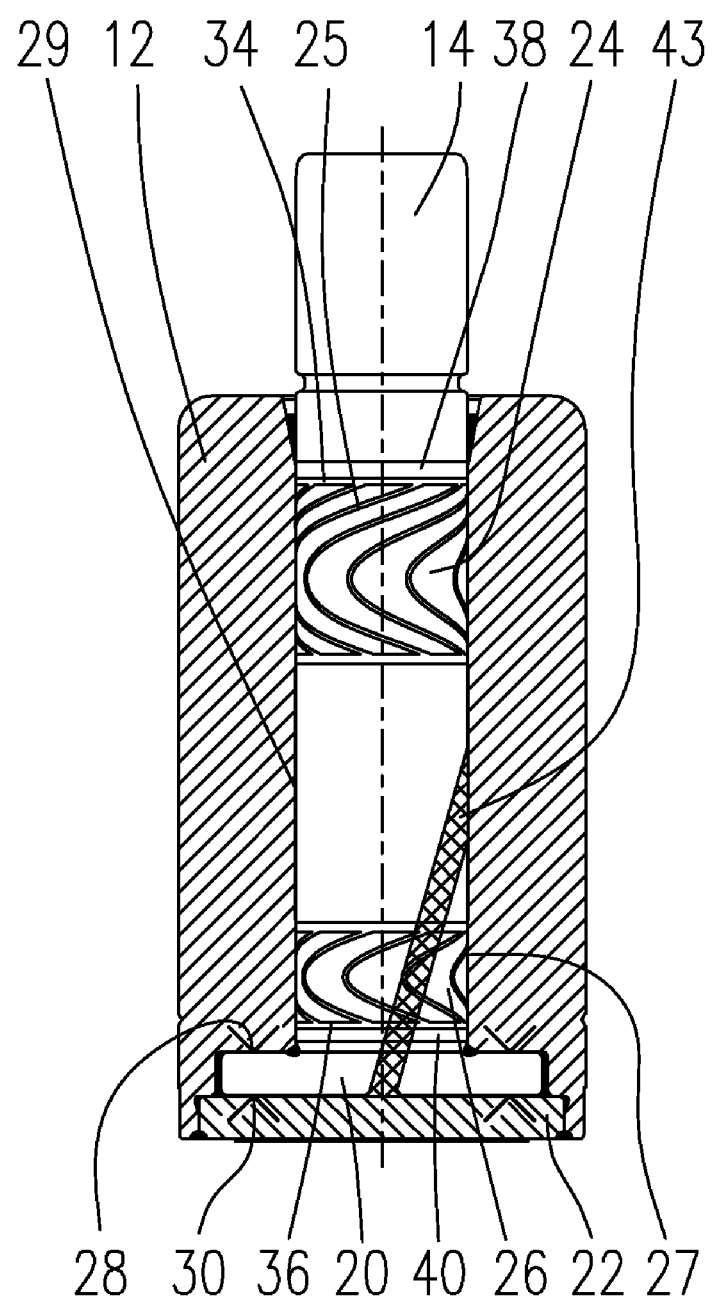
FIG. 8: shows an alternative embodiment of a bearing system according to the invention having a recirculation channel extending obliquely through the shaft.

FIG. 8 shows another embodiment of a bearing according to the invention in which there are no recirculation holes through the thrust plate 20. Instead, a recirculation channel 43 extends obliquely through the shaft 14 and thrust plate 20, the recirculation channel 43 starting at approximately the center of the lower end face of the thrust plate 20, extending obliquely through the shaft 14 and ending in the separator region 29 between the two radial bearing regions 24, 26. This embodiment of the bearing has the advantage that no recirculation holes have to be made in the thrust plate 20 that impair the effective axial bearing surface, that is reduce it. Since the start and end of the recirculation channel 43 have different radial distances to the rotational axis 48, additional centrifugal forces also affect the bearing fluid found in the recirculation channel 43 during the operation of the bearing. This goes to additionally accelerate the bearing fluid in the direction of the separator region 29 and makes it possible to achieve improved recirculation. As an alternative, the recirculation channel 43 may also occur in the shaft 14 and consist of various axial and radial sections.

Identification Reference List

10 Baseplate
12 Bearing bush
13 Bearing bore

14 Shaft
16 Hub
18 Bearing gap
20 Thrust plate
22 Covering cap
24 Radial bearing region
25 Radial bearing grooves
26 Radial bearing region
27 Radial bearing grooves
28 Axial bearing region
29 Separator region
30 Axial bearing region
32 Seal
34 Connecting groove
36 Connecting groove
38 Wear zone
40 Wear zone
42 Hole (thrust plate)
43 Recirculation channel
44 Stator arrangement
46 Permanent magnet
48 Rotational axis
50 Recess
52 Chamfer

The invention claimed is:

1. A fluid dynamic bearing system having a stationary bearing component (12; 22) and a moving bearing component (14; 20) that are separated from one another by a bearing gap (18) filled with a bearing fluid and disposed rotatably with respect to one another about a rotational axis (48), wherein two radial bearing regions (24; 26) separated axially from one another and marked by radial bearing grooves (25; 27) are provided, wherein a separator region (29) having a larger bearing gap width is located between the radial bearing regions (24; 26) and wherein the radial bearing grooves (25; 27) of the two radial bearing regions (24; 26) have inner ends facing each other and outer ends facing away from each other, and at least the outer ends of the radial bearing grooves (25; 27) are connected to each other by connecting grooves (34; 36), wherein wear zones (38; 40) are provided adjoining the connecting grooves (34; 36).

2. A fluid dynamic bearing system according to claim 1, characterized in that the wear zones (38; 40) lie on the same level as the bearing surfaces of the radial bearing regions (24; 26).

3. A fluid dynamic bearing system according to claim 1, characterized in that the depth of the connecting grooves (34; 36) approximately corresponds to the depth of the radial bearing grooves (25; 27).

4. A fluid dynamic bearing system according to claim 1, characterized in that the depth of the radial bearing grooves (25; 27) and the connecting grooves (34; 36) is approximately 6+/−2 micrometers.

5. A fluid dynamic bearing system according to claim 1, characterized in that the wear zones (38; 40) are wider than the respective adjoining connecting grooves (34; 36).

6. A fluid dynamic bearing system according to claim 1, characterized in that the width of the connecting grooves (34; 36) is approximately 0.1 mm.

7. A fluid dynamic bearing system according to claim 1, characterized in that the width of the wear zones (38; 40) is approximately 0.25 mm.

8. A fluid dynamic bearing system according to claim 1, characterized in that the surfaces of the wear zones (38; 40) is provided with a coating.

9. A fluid dynamic bearing system according to claim 8, characterized in that the coating of the wear zones (38; 40) is a DLC (diamond-like carbon) coating or a nickel coating or an NFC (near frictionless carbon) coating.

10. A fluid dynamic bearing system according to claim 1, characterized in that the stationary bearing component comprises a bearing bush (12) and a covering cap (22), and the moving bearing component comprises a shaft (14) and a thrust plate (20), the shaft (14) and the thrust plate (20) being rotatably disposed in a bearing bore (13) in the bearing bush (12).

11. A fluid dynamic bearing system according to claim 10, characterized in that the radial bearing grooves (25; 27), the connecting grooves (34; 36) and the wear zones (38; 40) are disposed on the bearing bush (12).

12. A fluid dynamic bearing system according to claim 11, characterized in that the surface of the bearing bore (13) in the bearing bush (12) is given a full coating or at least coated in the region of the wear zones (38; 40).

13. A fluid dynamic bearing system according to claim 10, characterized in that an axial bearing region (28) is formed between the thrust plate (20) and the bearing bush (12) and/or an axial bearing region (30) is formed between the thrust plate (20) and the covering cap (22).

14. A fluid dynamic bearing system according to claim 10, characterized in that the diameter of the shaft (14) is between 3 and 4 mm.

15. A fluid dynamic bearing system according to claim 10, characterized in that the thrust plate (20) is integrally formed with the shaft (14) as one piece.

16. A fluid dynamic bearing system according to claim 10, characterized in that the thrust plate (20) has at least one hole (42) extending approximately parallel to the rotational axis (48), and that the thrust plate (20) has a recess (50) in the exit region of the hole (42).

17. A fluid dynamic bearing system according to claim 1, characterized in that the surface of the shaft (14) is given a full coating or at least coated in the region lying opposite the wear zones (38; 40).

18. A fluid dynamic bearing system according to claim 1, characterized in that at least one recirculation channel (43) is disposed in the moving bearing component (14; 20), the recirculation channel (43) connecting the region of the lower end face of the moving bearing component to the separator region (29).

19. A fluid dynamic bearing system according to claim 18, characterized in that the recirculation channel (43) in the moving bearing component (14; 20) extends obliquely to the rotational axis (48).

20. A spindle motor having a stator and a rotor and a fluid dynamic bearing system for the rotatable support of the rotor (16), and an electromagnetic drive system (44; 46), wherein the fluid dynamic bearing system comprises a stationary bearing component (12; 22) and a moving bearing component (14; 20) that are separated from one another by a bearing gap (18) filled with a bearing fluid and disposed rotatably with respect to each other about a rotational axis (48), wherein two radial bearing regions (24; 26) separated axially from one another and marked by radial bearing grooves (25; 27) are provided, wherein a separator region (29) having a larger bearing gap width is located between the radial bearing regions (24; 26) and wherein the radial bearing grooves (25; 27) of the two radial bearing regions (24; 26) have inner ends facing each other and outer ends facing away from each other, and at least the outer ends of the radial bearing grooves (25; 27) are connected to each other by connecting grooves (34; 36), wherein wear zones (38; 40) are provided adjoining the connecting grooves (34; 36).

* * * * *